United States Patent [19]

Little et al.

[11] Patent Number: 5,149,558
[45] Date of Patent: * Sep. 22, 1992

[54] FREEZE DRIED SWEETENED CONDENSED SKIM MILK CRYSTALS AND ITS PROCESS OF MAKING

[75] Inventors: Cindy E. Little; Eric Cully, both of Orlando, Fla.

[73] Assignee: Crystals International, Plant City, Fla.

[*] Notice: The portion of the term of this patent subsequent to Jun. 18, 2008 has been disclaimed.

[21] Appl. No.: 714,889

[22] Filed: Jun. 17, 1991

Related U.S. Application Data

[63] Continuation-in-part of Ser. No. 491,085, Mar. 9, 1990, Pat. No. 5,024,848.

[51] Int. Cl.$^5$ ............................................. A23C 9/00
[52] U.S. Cl. .................................... 426/588; 426/491; 426/524; 426/580; 426/587
[58] Field of Search ............... 426/580, 587, 588, 524, 426/491

[56] References Cited

U.S. PATENT DOCUMENTS 4,853,246  8/1989  Stevens ........................... 426/588
5,024,848  6/1991  Little .............................. 426/587

Primary Examiner—Jeanette Hunter
Assistant Examiner—Helen Pratt
Attorney, Agent, or Firm—Fleit, Jacobson, Cohn, Price, Holman & Stern

[57] ABSTRACT

A process whereby sweetened condensed milk (SCM) or sweetened condensed skimmed milk (SCSM) is used as a starting material. The SCM or SCSM is pumped to a stainless steel refrigerated holding tank where it is diluted to 50°-65° brix (solids) with water. The product is then pumped into a continuous vacuum dryer, through a deaerator to control foaming and then into a feed pan. A stainless steel feed roll rotates in the feed pan and pick up SCM or SCSM product which then deposits a uniform layer of the SCM or SCSM on a continuous stainless steel belt. The clearance between the feed roll and the stainless steel belt is 0.015 to 0.025 inches. The SCM or SCSM product then goes through three heat zones at which vapor is driven off. Heat zone 1 preconcentrates and degasses the SCM or SCSM. This increases the area and volume of product so that it can withstand rapid evaporation occurring in heat zone 2. Heat zone 2 includes a hot drum at which a major portion of the drying occurs. Heat zone 3 adds additional heat to collapse puff and control final moisture content of the SCM or SCSM crystals.

5 Claims, 1 Drawing Sheet

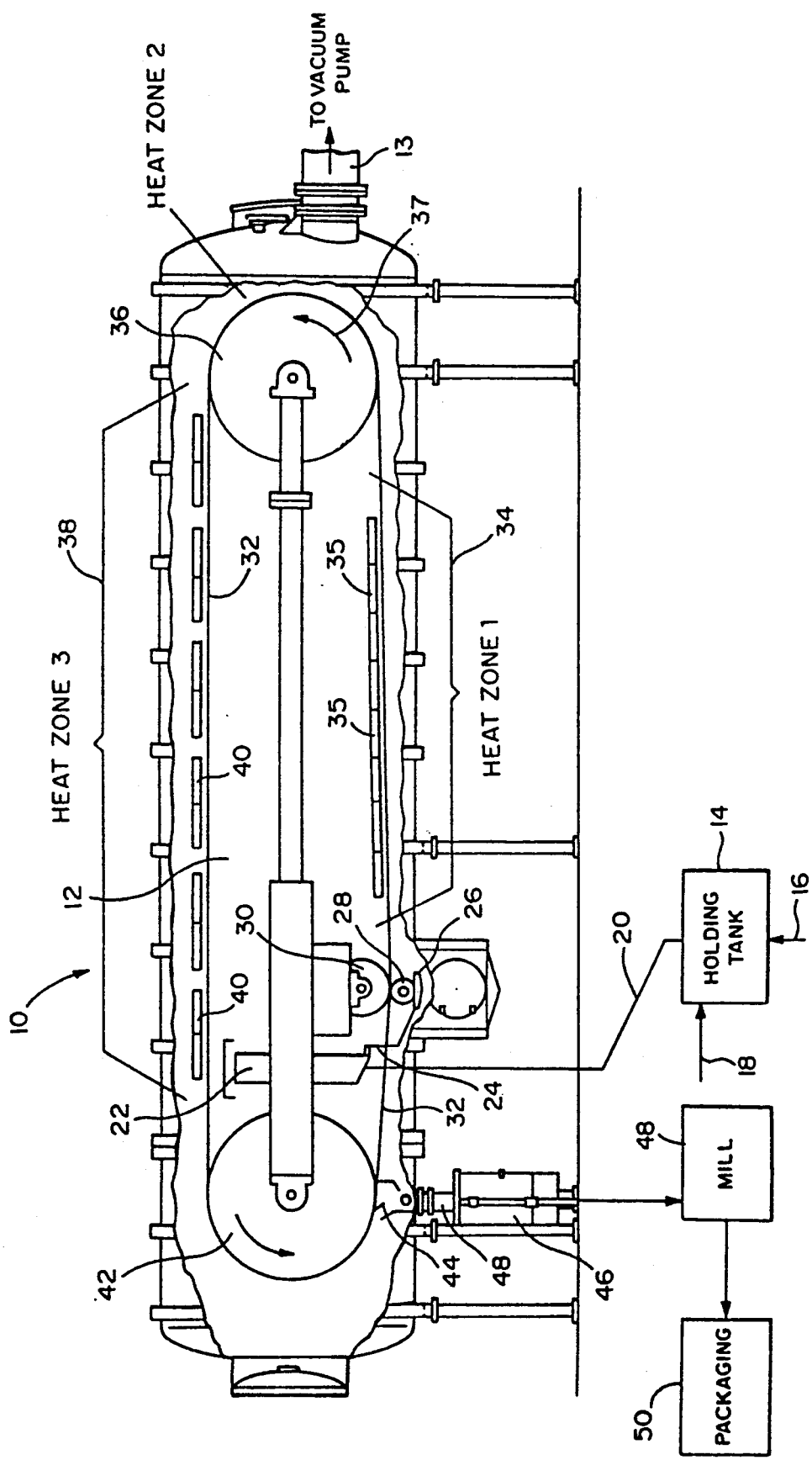

FREEZE DRIED SWEETENED CONDENSED SKIM MILK CRYSTALS AND ITS PROCESS OF MAKING

This application is a continuation-in-part application of application Ser. No. 07/491,085, filed Mar. 9, 1990 now U.S. Pat. No. 5,024,848.

Field of the Invention

This invention relates to freeze-dried sweetened condensed milk crystals, including whole milk and skimmed milk, and the process of drying sweetened condensed milk or sweetened condensed skimmed milk to a 100% crystalline form.

BACKGROUND OF THE INVENTION

Sweetened condensed milk is made by the addition of approximately 18% sugar to whole milk, followed by concentration under vacuum to approximately one half the volume. The product is canned without sterilizing, the sugar acting as a preservative. Federal standards of identity require 8.5% fat, 28.0% total milk solids and sufficient sugar to prevent spoilage. State standards range from 7.7 to 8.5% fat and 25.9 to 28% total milk solids. The proposed standards by FAO of 8% fat and 28% solids are common worldwide, although Australia and New Zealand require 9% fat and 31% total solids.

Sweetened condensed skimmed milk is made by the addition of approximately 18% sugar to skimmed milk, followed by concentration under vacuum to approximately one half the volume. The product is canned without sterilizing, the sugar acting as a preservative. Federal standards of identity require 0.05% fat, 24.0% total milk solids and sufficient sugar to prevent spoilage. State standards are 0.05% fat and 24% total milk solids. The proposed standards by FAO of 0.05% fat and 24% solids are common worldwide.

A typical analysis of commercially available liquid sweetened condensed milk includes 73% ±0.5 total solids with milk solids equalling 28% ±0.2, sucrose equalling 45% ±0.3 and milk fat equalling 8% ±0.25 with a pH of 6.25 ±0.25 with a water activity of 0.86, as is available from Galloway West Company of Fond Du Lac, Wis.

A typical analysis of commercially available liquid sweetened condensed skimmed milk includes 70% ±0.5 total solids with milk solids equalling 28% ±0.2, sucrose equalling 42% ±0.3 and milk fat not exceeding 0.05% with a pH of 6.25 ±0.25as is available from Galloway West Company of Fond Du Lac, Wis.

Sweetened condensed whole milk or sweetened condensed skimmed milk presently available in a can in a liquid form are not stable once the can is opened. This product has not previously been available in a dry form.

SUMMARY OF THE INVENTION

Traditional freeze-drying has included deep freezing a stationary product (batch) and removing the ice trapped therein by reducing pressure and causing the ice to sublime. The water vapor is then removed, leaving an undamaged, dried product. By the present invention, sweetened condensed milk or sweetened condensed skimmed milk is freeze dried by a continuous process in which a thin layer of the sweetened condensed milk or sweetened condensed skimmed milk is applied on a continuously moving belt and by subsequent heating caused to dry in a vacuum with water vapor continuously removed by evacuation.

By the present invention, sweetened condensed milk (SCM) or sweetened condensed skimmed milk (SCSM) is continuously dried to 100% SCM or 100% SCSM, respectively, without the addition of any carriers, such as corn syrups or maltodextrines.

According to the process of the present invention, sweetened condensed milk is used as a starting material. As an alternative, whole milk may be processed to sweetened condensed milk.

Alternatively, according to the process of the present invention, sweetened condensed skimmed milk is used as a starting material. As an alternative, whole milk may be processed to sweetened condensed skimmed milk.

The SCM or SCSM is pumped to a stainless steel refrigerated holding tank where it is diluted to 50°-65° brix (solids) with water. The product is then pumped into a Votator continuous vacuum dryer, through a deaerator to control foaming and then into a feed pan. A stainless steel feed roll rotates in the feed pan and picks up SCM product or SCSM product, respectively, which then deposits a uniform layer of the SCM or SCSM on a continuous stainless steel belt. The clearance between the feed roll and the stainless steel belt is 0.015-0.025 inches. The SCM or SCSM product then goes through three heat zones at which water vapor is driven off.

Heat zone 1 preconcentrates and degasses the SCM or SCSM. This increases the area and volume of product so that it can withstand rapid evaporation occurring in heat zone 2. Heat zone 2 includes a hot drum at which a major portion (approximately 85%) of the drying occurs. Heat zone 3 adds additional heat to collapse puff and control final moisture content of the SCM or SCSM crystals. From heat zone 3, the product passes over a cooling drum held at between 15° to 25° F. where the SCM is cooled below its plastic point so as to cause cooling and hardening of the product. The product is scraped off the belt downstream from the cooling drum in crystalline form and conveyed to a powder receiver. The crystals are collected and milled through a hammermill manufactured by Fitzpatrick of Elmhurst, Ill., model number DSA06 using a 2B screen, to achieve 100% SCM or 100% SCSM in a final crystalline form. The freeze-dried sweetened condensed milk crystals or freeze-dried sweetened condensed skimmed milk crystals are packaged in a vacuum-sealed foil bag. 305 grams of SCM crystals, when rehydrated with 100 grams of water, is equivalent in flavor and physical properties to canned sweetened condensed milk such as Eagle Brand Sweetened Condensed Milk available from Bordens. 305 grams of SCSM crystals, when rehydrated with 100 grams of water, is equivalent in flavor and physical properties to liquid sweetened condensed skimmed milk.

The freeze-dried sweetened condensed milk or sweetened condensed skimmed milk can be used in a dry form in the place of a liquid product. They are readily reconstituted in recipes for baking, ice cream, puddings, coffee creamers, and many other items. In addition, they may be used in instant pie mixes, such as Key Lime, lemon ice box, chocolate, and peanut butter pies. They have application in fudge, confection products, and any other recipe calling for use of sweetened condensed milk or sweetened condensed skimmed milk.

It is an object of the present invention to produce freeze-dried sweetened condensed milk crystals.

It is another object of the present invention to produce freeze-dried sweetened condensed skimmed milk crystals.

It is still another object of the present invention to provide a process for making freeze-dried sweetened condensed milk crystals.

It is still yet another object of the present invention to provide a process for making freeze-dried sweetened condensed skimmed milk crystals.

It is yet another object of the present invention to continuously produce freeze-dried sweetened condensed milk crystals by a continuous belt vacuum process.

It is yet another object of the present invention to continuously produce freeze-dried sweetened condensed skimmed milk crystals by a continuous belt vacuum process.

These and other objects of the invention, as well as many of the intended advantages thereof, will become more readily apparent when reference is made to the following description taken in conjunction with the accompany drawing.

BRIEF DESCRIPTION OF THE DRAWING

The Figure schematically illustrates a continuous belt vacuum dryer embodying the process of the invention.

DETAILED DESCRIPTION OF THE PREFERRED EMBODIMENTS

In describing a preferred embodiment of the invention illustrated in the drawing, specific terminology will be resorted to for the sake of clarity. However, the invention is not intended to be limited to the specific terms so selected, and it is to be understood that each specific terms includes all technical equivalents which operate in a similar manner to accomplish a similar purpose.

With reference to the drawing, a continuous vacuum dryer is generally designated as 10. Examples of continuous dryers are provided by U.S. Pat. No. 2,924,271 to Conley, U.S. Pat. No. 2,924,272 to Conley et al., U.S. Pat. No. 2,924,273 to Conley et al., U.S. Pat. No. 3,085,018 to Viall et al., and U.S. Pat. No. 3,105,589 to Conley et al. These patents are representative of certain features of the continuous vacuum dryer used in the method of the invention for producing the product of the invention, which are hereby incorporated by reference.

The dryer 10 includes a vacuum chamber 12, shown in cutaway section in the drawing. Evacuation line 13 is connected to a 4-stage steam vacuum system (not shown) to maintain the pressure in the vacuum chamber at 2.5 to 4.0 mm Hg.

Sweetened condensed milk or sweetened condensed skimmed milk is pumped in liquid form to stainless steel refrigerated holding tank 14 from conduit 16, where it is diluted to 50°-65° brix (solids), preferably 60° brix, with water from a source (not shown) through conduit 18 to form a solution. The sweetened condensed milk or sweetened condensed skimmed milk enters the dryer 10 from the holding tank at 38° F. The sweetened condensed milk or sweetened condensed skimmed milk is pumped by conduit 20 to deaerator 22 which is located in chamber 12 to remove entrapped air and control foaming.

The sweetened condensed milk or sweetened condensed skimmed milk is then pumped from the deaerator 22 by conduit 24 to feed pan 26. The SCM or SCSM enters the feed pan within the chamber 12 at a temperature of 15°-30° F. and then equilibrates to the temperature in the chamber. A stainless steel feed roll 28 rotates in the feed pan and picks up sweetened condensed milk or sweetened condensed skimmed milk.

A continuous stainless steel belt 32 is located between the feed roll 28 and a backing roll 30. Belt 32 travels within vacuum chamber 12 at a speed of 25 to 40 feet per minute. The feed roll 28 rotates in the feed pan 26 at a speed of 24 to 28 feet per minute and picks up sweetened condensed milk or sweetened condensed skimmed milk from the feed pan which is deposited as a uniform layer on the continuous stainless steel belt 32. The thin layer of SCM or SCSM is frozen on the belt 32 adjacent to the feed pan. The clearance between the feed roll and the stainless steel belt is 0.015-0.025 inches.

The belt 32 then conveys the frozen layer of sweetened condensed milk or sweetened condensed skimmed milk through a series of heating zones. The first heat zone 34 includes a plurality of banks of electrical calrod radiant heaters 35 using approximately 165-185 volts of electricity to produce sufficient heat to initiate drying of the frozen layer of SCM or SCSM. The voltage input directly affects the energy output which in heat zone 1 is set to produce 101,400 to 113,800 BTU's of heat. The first heat zone preconcentrates and degasses the layer of sweetened condensed milk or sweetened condensed skimmed milk. This increases the area and volume of product so that the product can withstand the rapid subsequent evaporation. Any vapor driven off is evacuated through evacuation line 13.

In a second heating zone formed by heating drum 36 over which the belt 32 passes, the major portion of the drying occurs. Drum 36 rotates in the direction of arrow 37. The temperature of the heating drum is controlled by steam pressure to a temperature of 165° to 220° F., preferably 165° to 180° F. Again, any vapor driven off is evacuated through evacuation line 13.

Continuing along the path of the belt, the belt 32 transfers the sweetened condensed milk or sweetened condensed skimmed milk to a third heating zone 38, which also includes calrod radiant heaters 40 operating at a voltage of between 185 to 200 volts to produce 113,800 to 123,500 BTU's of heat. The voltage of the heaters is controlled so as to minimize the heat exposure to the sweetened condensed milk or sweetened condensed skimmed milk at this stage so as to avoid burning the sweetened condensed milk or sweetened condensed skimmed milk. The burning of the sweetened condensed milk or sweetened condensed skimmed milk will produce a loss of flavor and produce carmelization of the product. The third heating zone adds additional heat to collapse puff of the product and control the final moisture content. Again, any final vapor driven off is evacuated through evacuation line 13.

From the third heating zone, the belt 32 and the sweetened condensed milk or sweetened condensed skimmed milk pass over a cooling drum 42, which is held at a temperature of 15° to 25° F. where the sweetened condensed milk or sweetened condensed skimmed milk is cooled below its plastic point so that the sweetened condensed milk or sweetened condensed skimmed milk is sufficiently hardened for removal. A doctor blade 44 scrapes the hardened sweetened condensed milk or hardened sweetened condensed skimmed milk off the belt 32 in powder form and the powder is conveyed to a powder receiver 46 through airlocks 48.

The crystals collected in the powder receiver 46 are milled at milling station 48 through a Fitzpatrick hammermill, model number DSA06, using a 2B screen, to achieve the final crystal form. The sweetened condensed milk granulation or sweetened condensed skimmed milk granulation, after passing through the 2B screen of the Fitzpatrick hammermill is:

| U.S. Sieve | # Percent |
|---|---|
| On 20 | 13.5 |
| On 40 | 28.5 |
| On 60 | 31.3 |
| Pan | 26.7 |
| Total: | 100.0 |

The sweetened condensed milk crystals or sweetened condensed skimmed milk crystals are then packaged at a packaging station 50 in a vacuum-sealed foil bag of 25 pounds.

305 grams of the sweetened condensed milk crystal, when rehydrated with 100 grams of water, provides the texture, flavor and physical properties of canned sweetened condensed milk or sweetened condensed skimmed milk. A final product moisture of 0.5 to 7.0% is achieved, preferably 0.5 to 2.5%.

305 grams of the sweetened condensed skimmed milk crystal, when rehydrated with 100 grams of water, provides the texture, flavor and physical properties of sweetened condensed skimmed milk. A final product moisture of 0.5 to 7.0% is achieved, preferably 0.5 to 2.5%.

The following example is provided for illustration purposes and should not be construed as limiting the scope of the invention.

Example I

Sweetened condensed milk was fed into a Votator continuous vacuum dryer set at 2.5 to 4.0 mm Hg pressure, the sweetened condensed milk entered the dryer at 38° F. and entered the feed pan at 15°-30° F. The sweetened condensed milk having total solids of 73%, milk solids of 28%, sucrose of 45%, milk fat of 8% and pH of 6.25 was diluted to 65° brix with water. The final product moisture content was 2.5%. The final product was 100% freeze-dried sweetened condensed milk crystals.

Example II

Sweetened condensed skimmed milk was fed into a Votator continuous vacuum dryer set at 2.5 to 4.0 mm Hg pressure, the sweetened condensed skimmed milk entered the dryer at 38° F. and entered the feed pan at 15°-30° F. The sweetened condensed skimmed milk having total solids of 70%, milk solids of 28%, sucrose of 45%, milk fat of 0.05% and pH of 6.25 was diluted to 65° brix with water. The final product moisture content was 2.5%. The final product was 100% freeze-dried sweetened condensed skimmed milk crystals.

Having described the invention, many modifications thereto will become apparent to those skilled in the art to which it pertains without deviation from the spirit of the invention as defined by the scope of the appended claims.

I claim:

1. A method of producing a food ingredient, said method comprising:
    forming a solution consisting of 100% sweetened condensed skimmed milk made of skimmed milk and sucrose,
    diluting said solution with water to form a solution have 50°-65° brix, and
    drying said solution under a pressure of 2.5 to 4.0 mm Hg by freeze-drying, effected by a continuous vacuum dryer to produce a dry food ingredient of 100% sweetened condensed skimmed milk crystals,
    said drying being effected at a temperature in the range of from 165°-220° F. to avoid carmelization of the 100% sweetened condensed skimmed milk.

2. A method of producing a food ingredient as claimed in claim 1, wherein the dry food ingredient includes a moisture content in the range of 0.5 to 7.0%.

3. A method of producing a food ingredient as claimed in claim 2, wherein the dry food ingredient includes a moisture content in the range of 0.5 to 2.5%.

4. Sweetened condensed skimmed milk crystals consisting of 100% sweetened condensed skimmed milk produced by the method of claim 1.

5. A method of producing a food ingredient as claimed in claim 1, wherein a cooling drum of the continuous vacuum dryer is at a temperature in the range of 15° to 25° F. for cooling of the sweetened condensed skimmed milk below its plastic point.

* * * * *